United States Patent
White et al.

(10) Patent No.: US 10,882,487 B2
(45) Date of Patent: Jan. 5, 2021

(54) AIRBAG WITH SELECTIVELY RELEASABLE EXTERNAL VENT

(71) Applicant: Ford Global Technologies, LLC, Dearborn, MI (US)

(72) Inventors: John Q. White, Livonia, MI (US); Jerry R. Brown, Northville, MI (US); Frank Heitplatz, Leverkusen/NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 57 days.

(21) Appl. No.: 16/287,681

(22) Filed: Feb. 27, 2019

(65) Prior Publication Data

US 2020/0269800 A1    Aug. 27, 2020

(51) Int. Cl.
*B60R 21/239* (2006.01)
*B60R 21/205* (2011.01)
*B60N 2/14* (2006.01)

(52) U.S. Cl.
CPC .............. *B60R 21/239* (2013.01); *B60N 2/14* (2013.01); *B60R 21/205* (2013.01); *B60R 2021/2395* (2013.01)

(58) Field of Classification Search
CPC ................ B60R 21/239; B60R 21/205; B60R 2021/2395
See application file for complete search history.

(56) References Cited

U.S. PATENT DOCUMENTS

| 6,517,108 | B1 | 2/2003 | Vinton et al. |
| 7,770,926 | B2 | 8/2010 | Schneider et al. |
| 8,231,140 | B2 | 7/2012 | Maripudi et al. |
| 8,888,128 | B1 | 11/2014 | Seo |
| 2011/0079988 | A1 | 4/2011 | Bauer et al. |
| 2017/0305381 | A1* | 10/2017 | Kwon .................. B60R 21/239 |
| 2019/0016294 | A1* | 1/2019 | Hayashi ............... B60R 21/239 |
| 2020/0122676 | A1* | 4/2020 | Sekizuka ............. B60N 2/4279 |
| 2020/0139923 | A1* | 5/2020 | Ostling ................. B60R 21/21 |

FOREIGN PATENT DOCUMENTS

| DE | 19818121 A1 | 5/1999 |
| DE | 102016216329 A1 | 3/2018 |

* cited by examiner

*Primary Examiner* — Faye M Fleming
(74) *Attorney, Agent, or Firm* — Frank A. MacKenzie; Bejin Bieneman PLC

(57) ABSTRACT

A vehicle including an instrument panel, a front seat rotatable between a forward-facing position and a rearward-facing position, and an airbag inflatable between the instrument panel and the front seat. The vehicle includes a controller including a processor and a memory storing processor-executable instructions wherein the processor is programmed to identify that the front seat is rearward-facing, inflate an airbag in response to a sensed frontal impact, and open an external vent in the airbag during inflation in response to identification that the front seat is rearward-facing.

20 Claims, 7 Drawing Sheets

AIRBAG WITH SELECTIVELY RELEASABLE EXTERNAL VENT

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
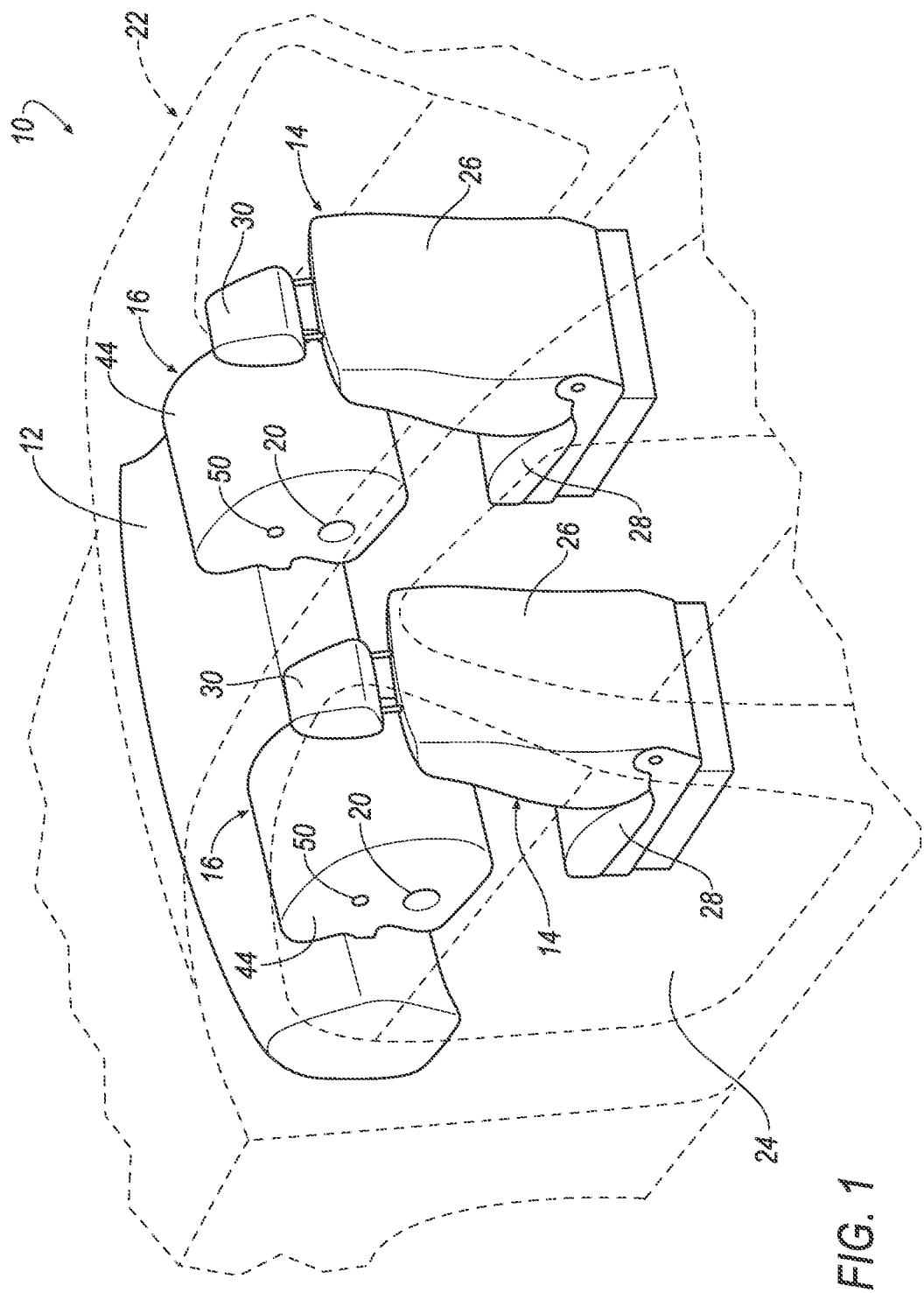
FIG. 1 is a perspective view of a portion of a vehicle with a pair of front seats in a forward-facing position and airbags in inflated positions.

A vehicle includes an instrument panel, a front seat rotatable between a forward-facing position and a rearward-facing position, and an airbag inflatable between the instrument panel and the front seat. The vehicle includes a controller including a processor and a memory storing processor-executable instructions wherein the processor is programmed to identify that the front seat is rearward-facing, inflate the airbag in response to a sensed frontal impact, and open an external vent in the airbag during inflation in response to identification that the front seat is in the rearward-facing position.

The identification that the front seat is rearward-facing may include receiving a rearward-facing seat signal indicating that the front seat is rearward-facing.

The processor may be further programmed to maintain the external vent in a closed position during inflation of the airbag in the absence of the rearward-facing seat signal.

The processor may be further programmed to open the external vent in the airbag during inflation in response to at least the rearward-facing seat signal.

The identification that the front seat is rearward-facing may include receiving a forward-facing seat signal indicating that the front seat is forward-facing.

The processor may be further programmed to maintain the external vent in a closed position during inflation of the airbag in response to at least the forward-facing seat signal.

The processor may be further programmed to release a tether to open the external vent in response to at least the forward-facing seat signal.

The processor may be further programmed to receive an occupancy signal indicating that the front seat is occupied by an occupant and inflate the airbag in response to at least the occupancy signal.

A controller includes a processor and a memory storing processor-executable instructions, wherein the processor is programmed to receive a frontal impact signal indicating detection of a collision to a front of a vehicle, identify that a front seat is rearward facing, inflate an airbag in response to at least the frontal impact signal, and open an external vent in the airbag in response to identification that the front seat is rearward-facing.

The identification that the front seat is rearward-facing may include receiving a rearward-facing seat signal indicating that the front seat is rearward-facing.

The processor may be further programmed to open the external vent in the airbag during inflation in response to at least the rearward-facing seat signal.

The processor may be further programmed to maintain the external vent in a closed position in the absence of the rearward-facing seat signal.

The identification that the front seat is rearward-facing may include receiving a forward-facing seat signal indicating that the front seat is forward-facing.

The processor may be further programmed to maintain the external vent in a closed position during inflation of the airbag in response to at least the forward-facing seat signal.

The processor may be further programmed to receive an occupancy signal indicating that the front seat is occupied by an occupant and inflate the airbag in response to at least the occupancy signal.

The processor may be further programmed to release a tether to open the external vent.

A method includes receiving a frontal impact signal indicating detection of a collision to a front of a vehicle, identifying that a front seat is rearward-facing, inflating an airbag in response to at least the frontal impact signal, and opening an external vent in the airbag in response to at least the front impact signal and identification that the front seat is rearward-facing.

Identifying that a front seat is rearward-facing may include receiving a rearward-facing seat signal indicating that the front seat is rearward-facing.

Identifying that a front seat is rearward-facing may include receiving a forward-facing seat signal indicating that the front seat is forward-facing.

The method may further include receiving an occupancy signal indicating that the front seat is occupied by an occupant and inflating the airbag in response to at least the occupancy signal.

With reference to the Figures, wherein like numerals indicate like parts throughout the several views, a vehicle 10 includes an instrument panel 12, a front seat 14 rotatable between a forward-facing position and a rearward-facing position, and an airbag 16 inflatable between the instrument panel 12 and the front seat 14. A controller 18 includes a processor and a memory storing processor-executable instructions. The controller 18 is programmed to identify that the front seat 14 is rearward-facing, inflate the airbag 16 in response to a sensed frontal impact, and open an external vent 20 in the airbag 16 during inflation in response identification that the front seat 14 is in the rearward-facing position.

The controller 18 provides individual tuning capabilities based on the direction of the front seat 14. The opening of the external vent 20 when the front seat 14 is in the rearward-facing position relieves pressure in the airbag 16.

In this position, the airbag 16 reinforces an upright position of the front seat 14 and without excessive force on the front seat 14. This configuration also manages energy over a smaller area/distance than when the front seat 14 is forward-facing. In contrast, when the front seat 14 is in the forward-facing position, the occupant of the front seat 14 is urged forwardly toward the airbag 16 in the event of a front impact. In that case, the controller 18 is programmed to not open the external vent 20 in the airbag 16. In this position, the airbag 16 is in a condition to control the kinematics of the occupant during the frontal impact. By providing individual tuning capabilities based on the direction of the front seat 14, weight savings are accomplished, e.g., a single airbag 16 is used for both positions of the front seat 14.

With reference to FIGS. 1-4, the vehicle 10 includes a body 22. The body 22 of the vehicle 10 defines a passenger compartment 24 to house occupants, if any, of the vehicle 10. The passenger compartment 24 includes one or more front seats 14 disposed at a front of the passenger compartment 24. In the example shown in FIGS. 1-4, the vehicle 10 includes two front seats 14. The vehicle 10 may include any suitable number of seats in any suitable position, e.g., front seats, back seats, left side, right side, etc.

The instrument panel 12 may be supported by the body 22. The instrument panel 12 is disposed at a forward end of the passenger compartment 24 and faces toward the front seats 14. In one example, the instrument panel 12 may include vehicle controls, including an instrument cluster, radio and climate control buttons, etc. In another example, the instrument panel 12 may include storage space or have other functions. In other examples, the instrument panel 12 may include no instruments, i.e., may be a bulkhead, wall, front console, etc.

The front seat 14 may include a seat back 26, a seat bottom 28, and a head restraint 30. The head restraint 30 may be supported by the seat back 26 and may be stationary or movable relative to the seat back 26. The seat back 26 may be supported by the seat bottom 28 and may be stationary or movable relative to the seat bottom 28. The seat back 26, the seat bottom 28, and/or the head restraint 30 may be adjustable in multiple degrees of freedom. Specifically, the seat back 26, the seat bottom 28, and/or the head restraint 30 may themselves be adjustable, in other words, adjustable components within the seat back 26, the seat bottom 28, and/or the head restraint 30, and/or may be adjustable relative to each other.

Figure 2:
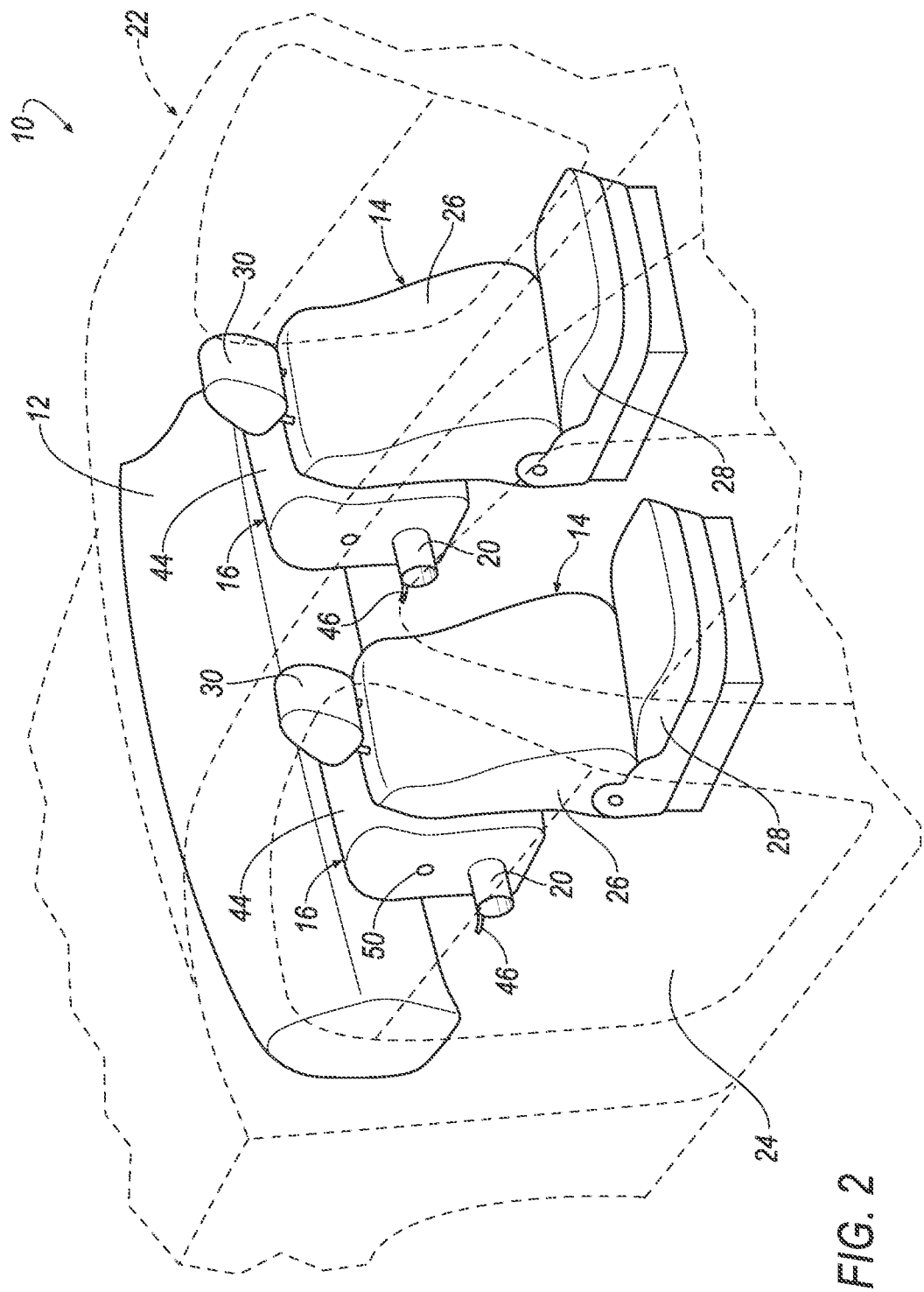
FIG. 2 is the perspective view of FIG. 1 with the front seats in a rearward-facing position and airbags in inflated positions.
Figure 3:
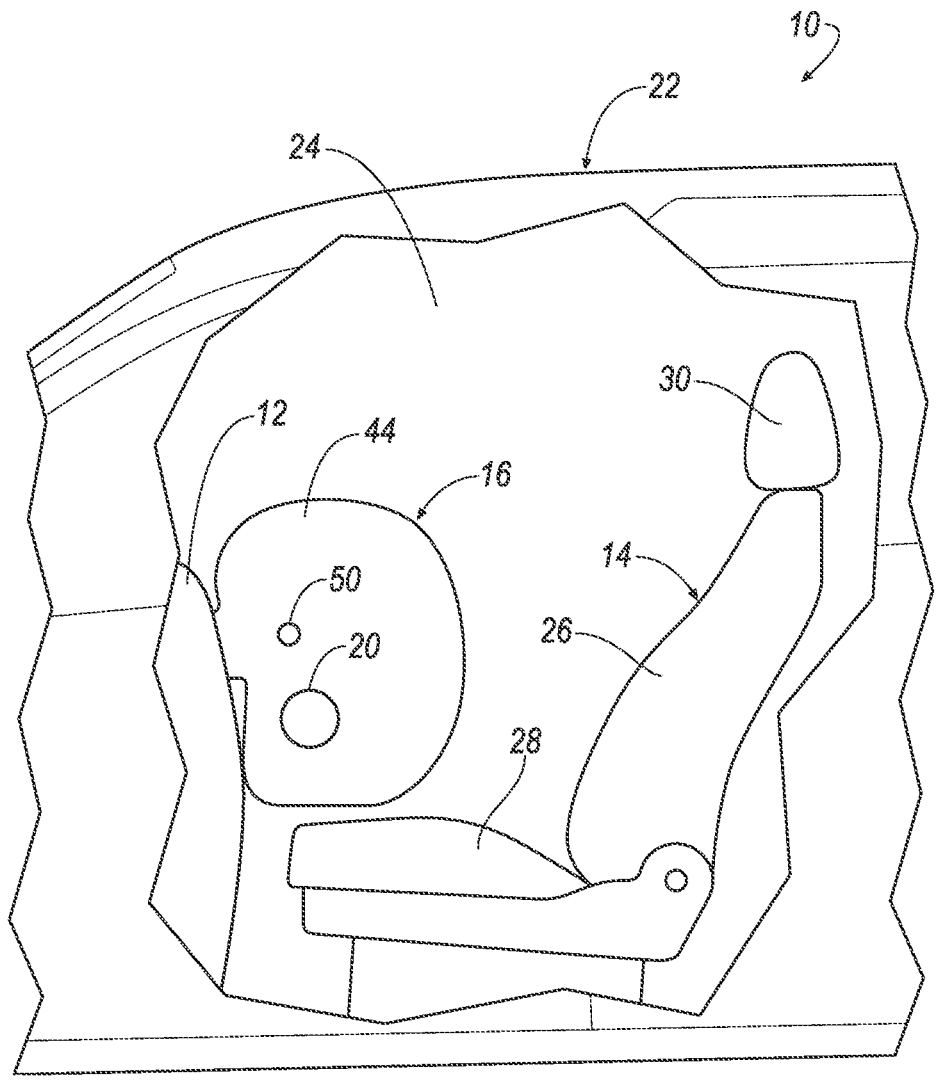
FIG. 3 is a side view of a portion of the vehicle with the front seat in the forward-facing position and airbags in inflated positions.
Figure 4:
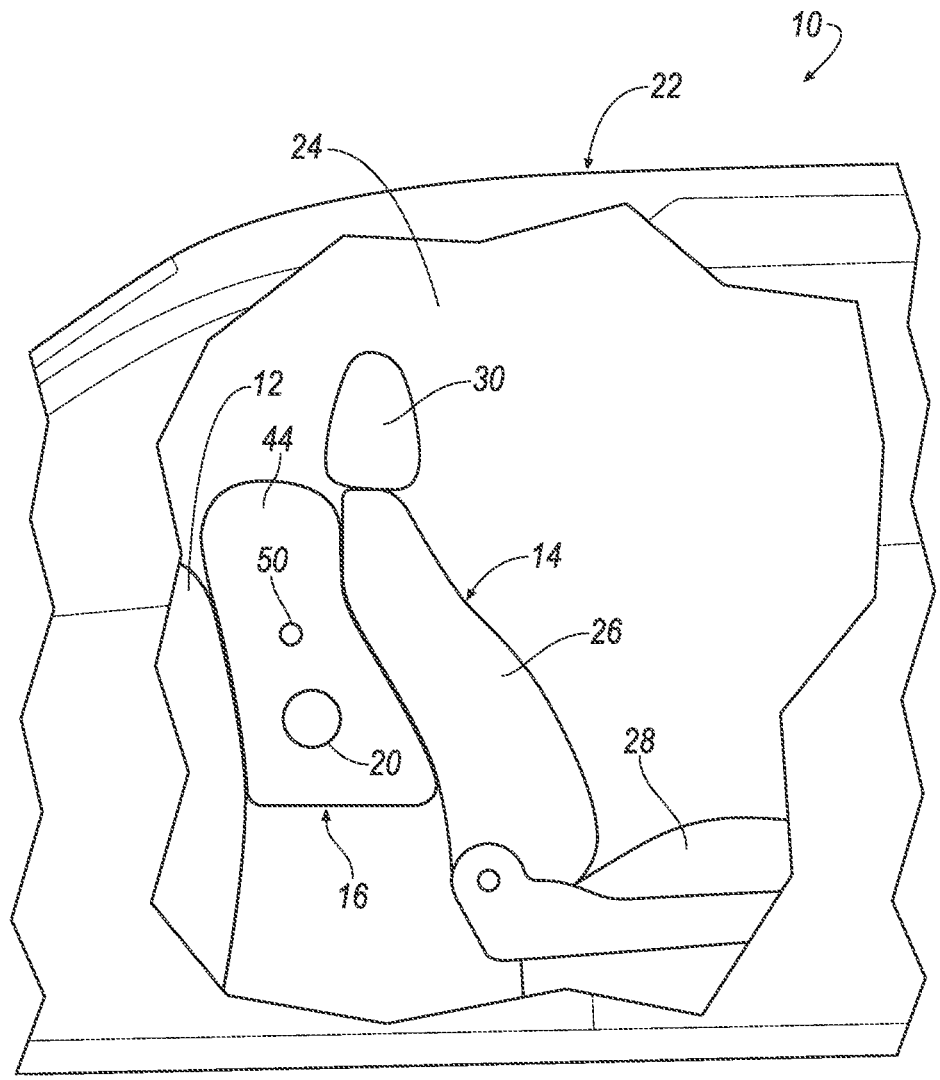
FIG. 4 is a side view of a portion of the vehicle with the front seat in the rearward-facing position and airbags in inflated positions.

As set forth above, the front seat 14 is rotatable between the forward-facing position and the rearward-facing position. The seat bottom 28 may rotate relative to the rest of the vehicle 10. For example, the front seat 14 rotates relative to the instrument panel 12, the body 22, a floor of the vehicle 10, etc. As shown in FIGS. 1 and 3, when the front seat 14 is forward-facing, the front seat 14 faces the instrument panel 12, i.e., an occupant in the front seat 14 will be facing the instrument panel 12. As shown in FIGS. 2 and 4, when the front seat 14 is rearward-facing, the front seat 14 faces vehicle rearward, i.e., an occupant in the front seat 14 will be facing away from the instrument panel 12.

The vehicle 10 may include an orientation sensor 32 programmed to detect the position of the front seat 14. In other words, the orientation sensor 32 identifies the position of the front seat 14, i.e., whether the front seat 14 is in the forward-facing position or the rearward-facing position. The orientation sensor 32 may be a component of the front seat 14. As examples, the orientation sensor 32 may include a Hall-effect sensor, a potentiometer, a proximity sensor, a capacitive sensor, rotary encoder, or any other hardware used to measure position, rotational, and/or rotational angle. In one example, the orientation sensor 32 may produce the rearward-facing seat signal indicating that the front seat 14 is in the rearward-facing position. In addition, or in the alternative, the orientation sensor 32 may produce a forward-facing seat signal indicating that the front seat 14 is in the forward-facing position. The orientation sensor 32 may generate a signal, e.g., the rearward-facing seat signal, the forward-facing seat signal, etc., and the signal may be transmitted to the controller 18 in any suitable fashion. For example, the signal may be transmitted to the controller 18 through a communication network 34 of the vehicle 10, as described below.

Figure 7:
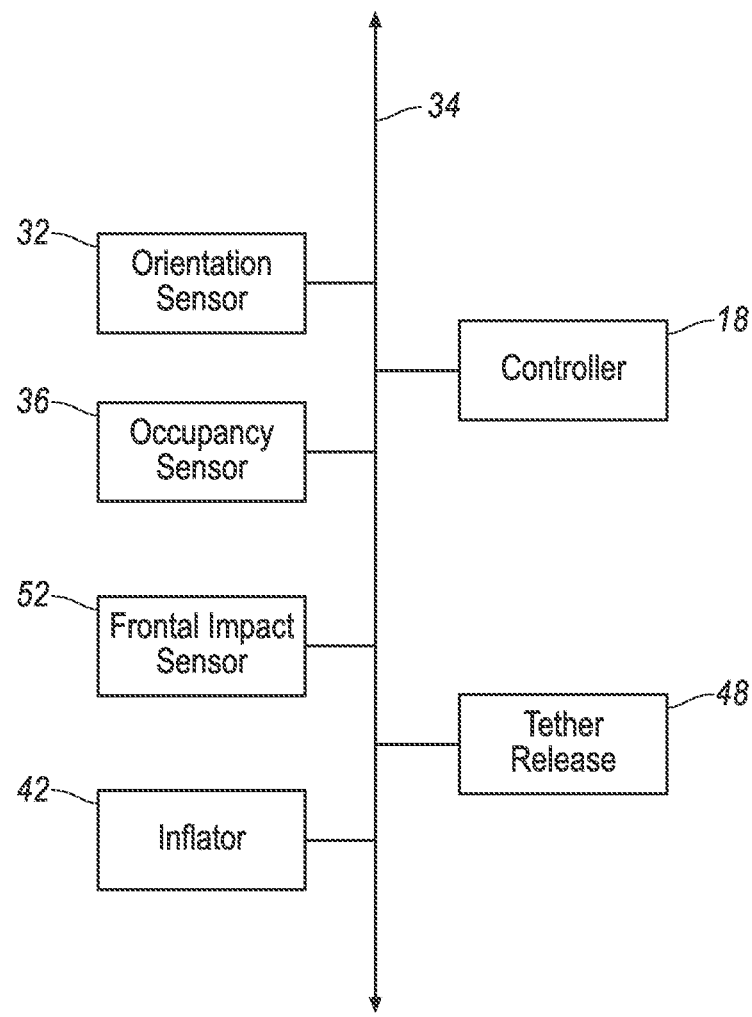
FIG. 7 is a block diagram including electronic components of the vehicle.

As shown in the block diagram in FIG. 7, the communication network 34 includes hardware, such as a communication bus, for facilitating communication among vehicle components. The communication network 34 may facilitate wired or wireless communication among the vehicle components in accordance with a number of communication protocols such as controller area network (CAN), Ethernet, WiFi, Local Interconnect Network (LIN), and/or other wired or wireless mechanisms.

The vehicle 10 may include an occupancy sensor 36 that identifies occupancy of the front seat 14. In other words, the occupancy sensor 36 identifies whether the front seat 14 is occupied or unoccupied. The occupancy sensor 36 may generate an occupancy signal indicating when the front seat 14 is occupied and/or may generate a vacant signal indicating the front seat 14 is unoccupied. For example, when an occupant is seated in the front seat 14, the occupancy sensor 36 may generate the occupancy signal indicating the presence of the occupant. The occupancy signal may be transmitted to the controller 18 through the communication network 34 in the vehicle 10. In the absence of an occupant seated in the front seat 14, i.e., the front seat 14 is empty, the occupancy sensor 36 may generate the vacant signal or may generate no signal, either of which indicate to the controller 18 that the front seat 14 is not occupied by an occupant. The occupancy sensor 36 may be a component of the front seat 14 or may be separate from and interact with the front seat 14. As examples, the occupancy sensor 36 may be a pressure sensor on the front seat 14, an image detector aimed at the front seat 14, a belt payout sensor measuring the payout of seatbelt webbing, etc.

Figure 5:
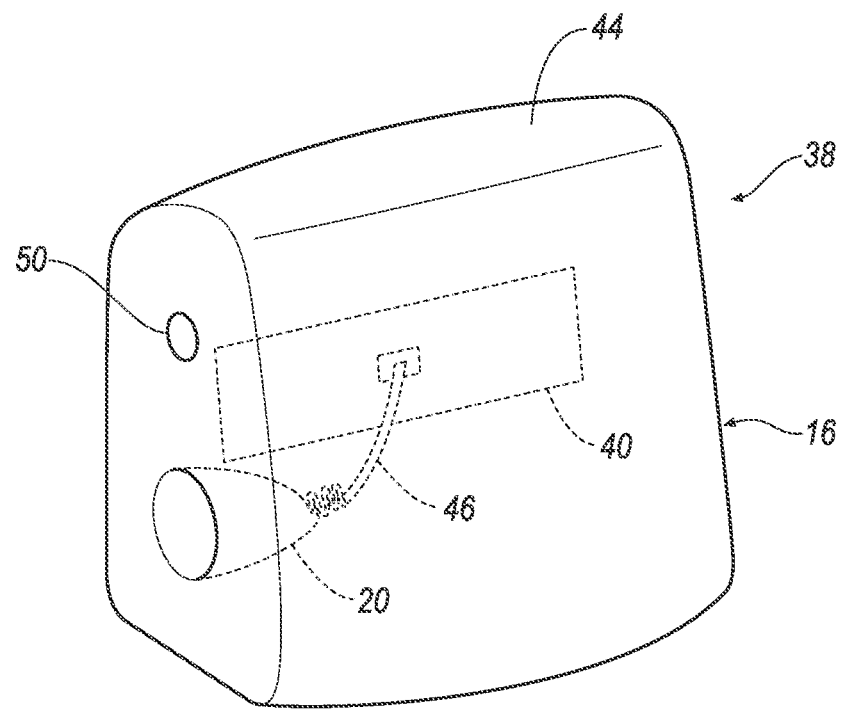
FIG. 5 is a perspective view of the airbag with an external vent in a closed position.
Figure 6:
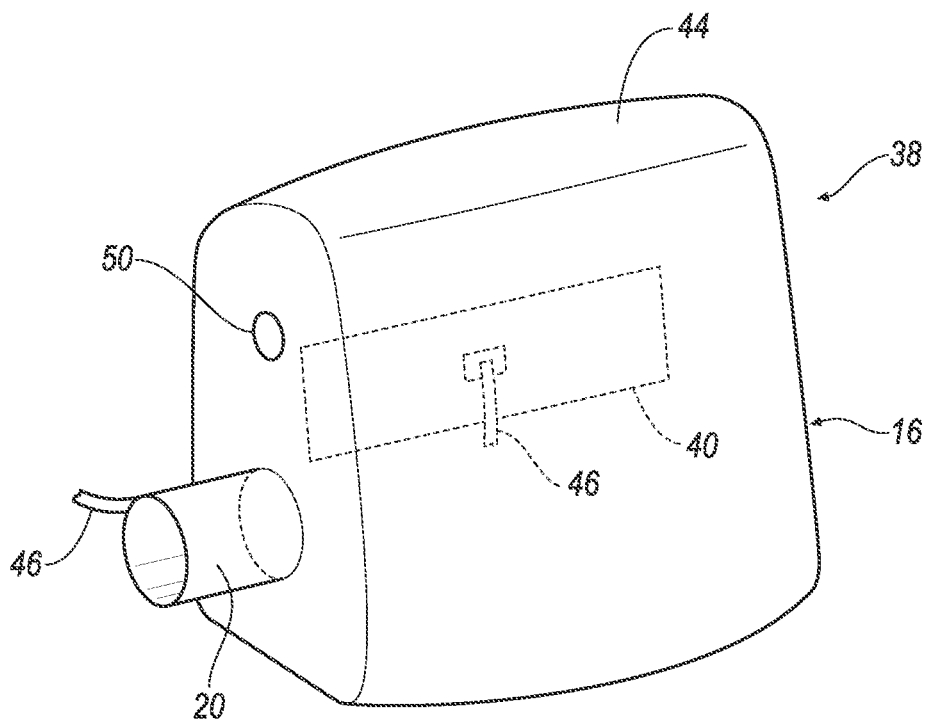
FIG. 6 is a perspective view of the airbag with the external vent in an open position.

With reference to FIGS. 4, 5, and 6, the vehicle 10 includes an airbag assembly 38 including an airbag housing 40, an inflator 42, and the airbag 16. As discussed above, the airbag 16 is inflatable between the instrument panel 12 and the front seat 14 from an uninflated to an inflated position. During normal operation of the vehicle 10, the airbag 16 may be in the uninflated position. In the event of a collision, the inflator 42 may inflate the airbag 16 to control the kinematics of the occupant of the front seat 14.

The airbag housing 40 may be mounted to the instrument panel 12. The airbag housing 40 and the instrument panel 12 provide a reaction surface for the airbag 16 in the inflated position, i.e., when force is applied to the airbag 16 in the inflated position, the airbag 16 is positioned by the instrument panel 12. The airbag housing 40 may be any material, e.g., a rigid polymer, a metal, a composite, etc.

In the inflated position, the airbag 16 defines an inflation chamber 44. The airbag 16 may include one or more tethers disposed in the inflation chamber 44 to control the shape of the airbag 16 during inflation and/or in the inflated position.

The airbag 16 may be a woven polymer or any other material. In one example, the airbag 16 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 42 and the airbag 16 may be disposed in the airbag housing 40 in the uninflated position. The inflator 42 is in fluid communication with the airbag 16. Upon receiving a signal from, e.g., the controller 18, the inflator 42 inflates the airbag 16 with an inflatable medium, such as a gas. The inflator 42 may be, for example, a pyrotechnic inflator that uses a chemical reaction to drive inflation medium to the airbag 16. The inflator 42 may be of any suitable type, for example, a cold-gas inflator.

With reference to FIGS. 5 and 6, the external vent 20 may be in either an open position or a closed position, i.e., is an adaptive vent. In the open position, the external vent 20 relieves pressure from the inflation chamber 44 external to the airbag 16. In the closed position, little or no gas flows through the external vent 20. As set forth above, the controller 18 releases the external vent 20 during inflation in response identification that the front seat 14 is in the rearward-facing position, and the external vent 20 is in the closed position during inflation of the airbag 16 when the front seat 14 is in the forward-facing position.

The open position and the closed position of the external vent 20 are each independent from one another, i.e., the inflation of the airbag 16 when the front seat 14 is in the rearward-facing position may be tunable separately from the inflation of the airbag 16 when the front seat 14 is in the forward-facing position.

The controller 18 controls the position of the external vent 20. For example, for the open position, the controller 18 may provide an instruction to release the external vent 20 to the open position during inflation of the airbag 16; and for the closed position, the controller 18 may provide an instruction to maintain the external vent 20 in the closed position during inflation of the airbag 16, or may refrain from providing an instruction to release the external vent 20 to the open position.

The airbag assembly may include a tether 46 connected to the external vent 20 for selectively maintaining the external vent 20 in the closed position and releasing the external vent 20 to the open position. As an example, the tether 46 may be engaged with and releasable relative to the airbag housing 40. For example, the tether 46 may be engaged directly with the airbag housing 40; as another example the tether 46 may fixed relative to the airbag housing 40 through direct engagement with an intermediate component that is fixed relative to the airbag housing 40, e.g., a component of the instrument panel 12. In any event, the tether 46 may be releasable relative to the airbag housing 40, i.e., one end because free relative to the airbag housing 40, to release the external vent 20 to the open position.

As an example, the airbag assembly includes a tether release 48 that selectively maintains the tether 46 fixed relative to the airbag housing 40 to retain the external vent 20 in the closed position or releases the tether 46 to allow the external vent 20 to move to the open position during inflation of the airbag 16. The tether release 48 is in communication with the controller 18 and the controller 18 controls operation of the tether release 48. In other words, the controller 18 is programmed to instruct the tether release 48 to release the tether 46 during inflation when the front seat 14 is in the rearward-facing position. The controller 18 is programmed to instruct the tether release 48 to maintain the tether 46 engaged with the airbag housing 40 during inflation when the front seat 14 is in the forward-facing position. The tether 46 may be released in any way suitable to allow the external vent 20 to move to the open position during inflation of the airbag 16. The tether release 48 may be pyrotechnic, i.e., may include a charge that is ignited to release the tether 46. The tether release 48 may include a cutter that cuts the tether 46, a pin that retracts relative to the tether 46, etc.

The airbag 16 may include one or more open vents 50 at various location around the airbag 16. The open vent(s) 50 relieve pressure in the inflation chamber 44 to tune the design of the operation of the airbag 16.

When the airbag 16 is in the inflated position and the front seat 14 is in the rearward-facing position, the airbag 16 contacts the seat back 26. In this position, the airbag 16 supports the seatback against forward movement. The airbag 16 may conform to the shape of the seat back 26.

The vehicle 10 may include a frontal impact sensor 52. The frontal impact sensor 52 may be in communication with the controller 18. The frontal impact sensor 52 is programmed to detect a collision to the front of the vehicle 10. The frontal impact sensor 52 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The frontal impact sensor 52 may be located at numerous points in or on the vehicle 10.

In the event of a collision to a front of the vehicle 10, the frontal impact sensor 52 may detect the collision and transmit a frontal impact signal to the controller 18. The controller 18 may transmit a signal through the communications network to the inflator 42. The inflator 42 may discharge and inflate the airbag 16.

The controller 18, implemented via circuits, chips, or other electronic components, is included in a vehicle control system for carrying out various operations, including as described herein. The controller 18 is a computing device that generally includes a processor and a memory, the memory including one or more forms of computer-readable media and storing instructions executable by the processor for performing various operations, including as disclosed herein. The memory of the controller 18 further generally stores remote data received via various communications mechanisms; e.g., the controller 18 is generally configured for communications on the controller area network (CAN) bus or the like, and/or for using other wired or wireless protocols, e.g., Bluetooth, etc. The controller 18 may also have a connection to an onboard diagnostics connector (OBD-II). Via a communication network using Ethernet, WiFi, the CAN bus, Local Interconnect Network (LIN), and/or other wired or wireless mechanisms, the controller 18 may transmit messages to various devices in the vehicle and/or receive messages from the various devices, e.g., controllers, actuators, sensors, etc., e.g., controllers and sensors as discussed herein.

The controller 18 may be in communication with the communication network 34 of the vehicle 10 to send and/or receive instructions to and from components of the vehicle 10. In other words, the controller 18 is a computer. The controller 18 may be a microprocessor-based computing device implemented via circuits, chips, or other electronic components. The controller 18 includes a processor, memory, etc. The memory of the controller 18 includes memory for storing instructions executable by the processor as well as for electronically storing data and/or databases.

The processor of the controller 18 may be programmed to send and receive signals. The processor may send signals to execute operations of components in the vehicle 10 based on the receipt of signals.

The controller 18 is programmed to identify that the front seat 14 is rearward-facing or forward-facing. In one example, the controller 18 may be programmed to receive the rearward-facing seat signal indicating that the front seat 14 is rearward-facing. Said another way, the controller 18 may receive the rearward-facing seat signal from the orientation sensor 32 and the controller 18 is programmed to receive the rearward-facing seat signal. As another example, the controller 18 may be programmed to receive the forward-facing seat signal indicating that the front seat 14 is forward-facing. Said another way, the controller 18 may receive the forward-facing seat signal from the orientation sensor 32 and the controller 18 is programmed to receive the forward-facing seat signal. The controller 18 may be programmed to identify that the front seat 14 is rearward-facing or forward-facing based on only one of the forward-facing seat signal and the rearward-facing seat signal. In such an example, the front seat 14 may be movable in a binary fashion between the forward-facing position and the rearward-facing position. In such cases, the controller 18 may be programmed to identify that the front seat 14 is forward-facing based a forward-facing seat signal and that the front seat 14 is rearward-facing based on a lack of a forward-facing seat signal. As another example, the controller 18 may be programmed to identify that the front seat 14 is rearward-facing based on a rearward-facing seat signal and that the front seat 14 is forward-facing based on a lack of a rearward-facing seat signal.

Figure 8:
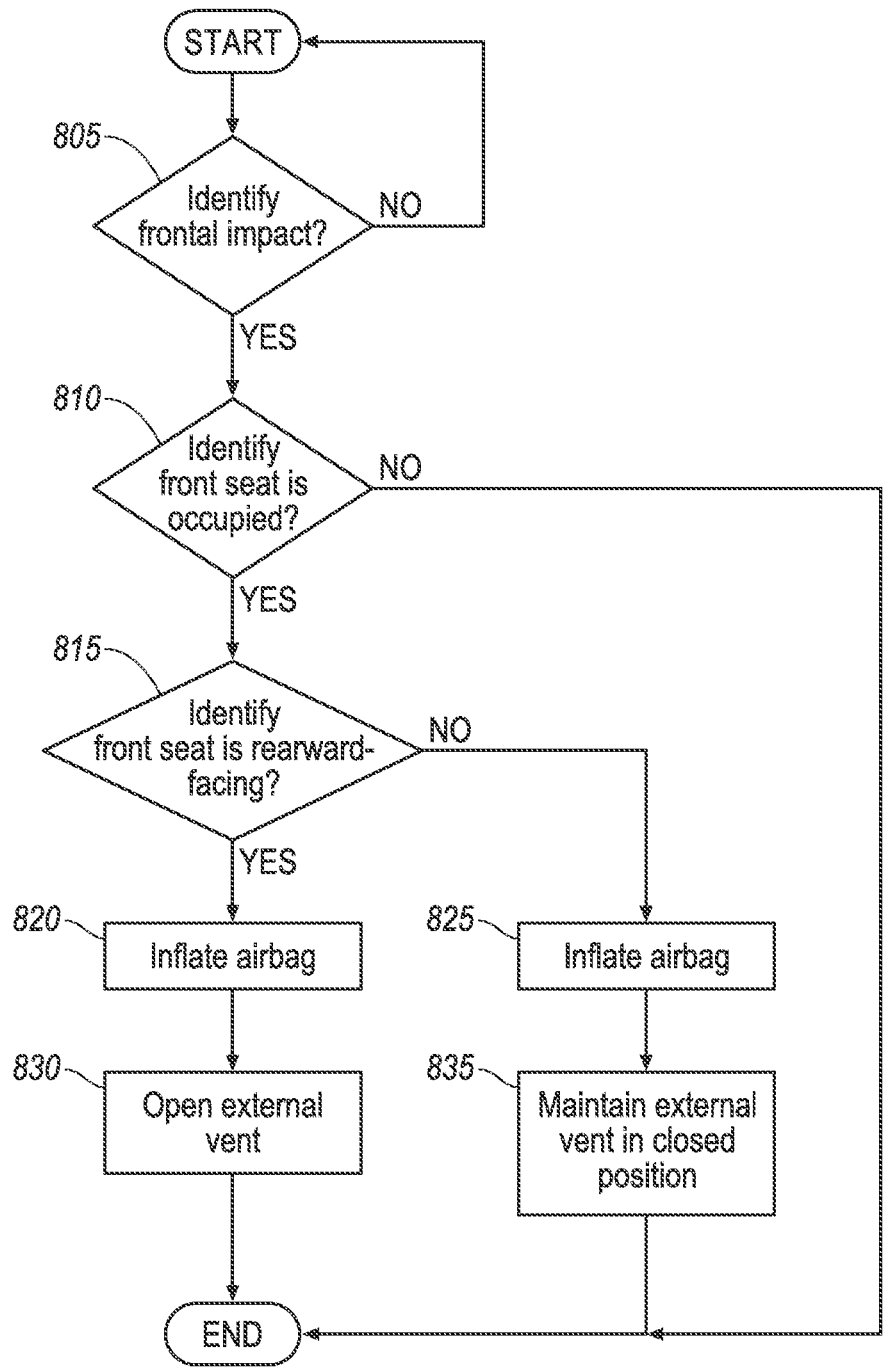
FIG. 8 is a flowchart for the deployment of the airbag.

With reference to the flowchart in shown in FIG. 8, the controller 18 is programmed to receive the frontal impact signal indicating detection of a collision to the front of the vehicle 10. As previously discussed, in the event of a collision to the front of the vehicle 10, the frontal impact sensor 52 may detect the collision. The frontal impact sensor 52 may transmit the frontal impact sensor 52 to the processor of the controller 18. The processor will receive the frontal impact signal and detect that a collision has occurred to the front of the vehicle 10.

The controller 18 is programmed to inflate the airbag 16 in response to at least the frontal impact signal. Said another way, if a collision is detected by the frontal impact sensor 52, the controller 18 is programmed to inflate the airbag 16. Specifically, the processor instructs the inflator 42 to inflate the airbag 16.

The controller 18 is programmed to receive the occupancy signal indicating that the front seat 14 is occupied by an occupant and inflate the airbag 16 in response to at least the occupancy signal. Specifically, the occupancy sensor 36 transmits the occupancy signal to the processor of the controller 18 when the front seat 14 is occupied.

When the processor receives the occupancy signal and the frontal impact signal, the controller 18 is programmed to instruct the airbag 16 to inflate in response to at least the occupancy signal and the frontal impact signal. In the absence of the occupancy signal, the airbag 16 may not inflate in response to the frontal impact signal.

The controller 18 may be programmed to open the external vent 20 in the airbag 16 when the processor identifies that the front seat 14 is occupied and is rearward-facing during a frontal impact. As an example, the controller 18 may be programmed to open the external vent 20 in the airbag 16 in response to the frontal impact signal, the rearward-facing seat signal, and the occupancy signal.

As an example, the controller 18 may be programmed release the tether 46 to open the external vent 20 when the processor identifies that the front seat 14 is occupied and is rearward-facing during a frontal impact. Specifically, the processor may be programmed to release the tether 46 to open the external vent 20 in response to the receipt of the frontal impact signal, the rearward-facing seat signal, and the occupancy signal. Specifically, the controller 18 may be programmed to instruct the tether release 48 to release the tether 46, e.g., to ignite a pyrotechnic charge in the tether release 48.

The controller 18 may be programmed to maintain the external vent 20 in the closed position when the processor identifies that the front seat 14 is occupied and is forward-facing during a frontal impact. As an example, the controller 18 may be programmed to maintain the external vent 20 in the closed position in response to the frontal impact signal, the forward-facing seat signal, and the occupancy signal. As an example, the controller 18 may be programmed to refrain from instructing the tether release 48 to release the tether 46.

A method of operating the examples shown in FIGS. 1-7 is shown in FIG. 8. The controller 18 may be programmed to perform the method shown in FIG. 8.

As shown in decision block 805, the method includes identifying whether there has been a frontal impact to the vehicle 10. In one example, the method includes receiving the frontal impact signal indicating detection of a collision to the front of the vehicle 10.

As shown in decision block 810, the method includes identifying whether the front seat 14 of the vehicle is occupied. In one example, the method includes receiving the occupancy signal indicating that the front seat 14 is occupied by an occupant and inflating the airbag 16 in response to at least the occupancy signal. In the absence of the occupancy signal, the airbag 16 may not inflate in response to the frontal impact signal.

As shown in decision block 815, the method includes identifying that the front seat 14 is rearward-facing or forward-facing. In one example, the method may include receiving the rearward-facing seat signal indicating that the front seat 14 is rearward-facing. In another example the method may include receiving the forward-facing seat signal indicating that the front seat 14 is forward facing. The method may include identifying that the front seat 14 is reward-facing or forward-facing based on only one of the forward-facing seat signal and the rearward-facing seat signal. In such an example, the front seat 14 may be movable in a binary fashion between the forward-facing and the rearward-facing position. In such cases, the method may include identifying that the front seat 14 is forward-facing based a forward-facing seat signal and that the front seat 14 is rearward-facing based on a lack of a forward-facing seat signal. As another example, the method may include identifying that the front seat 14 is rearward-facing based on a rearward-facing seat signal and that the front seat 14 is forward-facing based on a lack of a rearward-facing seat signal.

With reference to blocks 820 and 825, the method includes inflating the airbag 16 in response to at least the identification of a frontal impact. For example, the method includes instructing the inflator 42 to inflate the airbag 16 in response to a frontal impact signal from the frontal impact sensor 52.

Based on the decision in decision block 815, the method includes either opening the external vent 20, as shown in block 830, or maintaining the external vent 20 in a closed position, as shown in block 835.

With reference to blocks 830, the method includes opening the external vent 20 in the airbag 16 during a frontal impact when the front seat 14 is occupied and rearward-facing. Specifically, the method includes opening the external vent 20 in response to identification of a frontal impact, identification that the front seat 14 is occupied, and identification that the front seat 14 is rearward-facing. As an example, the method includes opening the external vent 20 in response to at least the front impact signal, the rearward-facing seat signal, and the occupancy signal. As an example, the method may include releasing the tether 46 to open the external vent 20 in response to identification that the front seat 14 is occupied and is rearward-facing during a frontal impact. Specifically, the method may include releasing the tether 46 to open the external vent 20 in response to receiving the frontal impact signal, the rearward-facing seat signal, and the occupancy signal. Specifically, the method may include instructing the tether release 48 to release the tether.

With reference to block 835, the method may include maintaining the external vent 20 in the closed position when the front seat 14 is occupied and is forward-facing during a frontal impact, e.g., in response to identification that the front seat 14 is occupied and is forward-facing during a frontal impact. As an example, the method may include maintaining the external vent 20 in the closed position in response to the frontal impact signal, the forward-facing seat signal, and the occupancy signal. Maintaining the external vent 20 in the closed position may be an affirmative step, e.g., sending a signal instructing the external vent 20 to be in the closed position, or may be the absence of an instruction to release the external vent 20 to the open position, e.g., absence of an instruction to the tether release 48 to release the tether 46.

With regard to the method 800 described herein, it should be understood that, although the steps of such method 800 have been described as occurring according to a certain ordered sequence, such method 800 could be practiced with the described steps performed in an order other than the order described herein. It further should be understood that certain steps could be performed simultaneously, that other steps could be added, or that certain steps described herein could be omitted. In other words, the description of the method 800 herein is provided for the purpose of illustrating certain embodiments and should in no way be construed so as to limit the disclosed subject matter.

Computing devices, such as the controller 18, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to" and "upon determining" herein indicates a causal relationship, not merely a temporal relationship. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   an instrument panel;
   a front seat rotatable between a forward-facing position and a rearward-facing position;
   an airbag inflatable between the instrument panel and the front seat;
   a controller including a processor and a memory storing instructions executable by the controller to:
   identify that the front seat is rearward-facing, inflate the airbag in response to a sensed frontal impact when the front seat is rearward facing, and open an external vent in the airbag during inflation in response to identification that the front seat is in the rearward-facing position; and
   identify that the front seat is forward-facing, inflate the airbag in response to a sensed frontal impact when the front seat is forward facing, and maintain the external vent in the airbag during inflation in response to identification that the front seat is in the forward-facing position.

2. The vehicle of claim 1, wherein the identification that the front seat is rearward-facing includes receiving a rearward-facing seat signal indicating that the front seat is rearward-facing.

3. The vehicle of claim 2, wherein the instructions further include instructions to maintain the external vent in a closed position during inflation of the airbag in the absence of the rearward-facing seat signal.

4. The vehicle of claim 2, wherein the instructions further include instructions to open the external vent in the airbag during inflation in response to at least the rearward-facing seat signal.

5. The vehicle of claim 1, wherein the identification that the front seat is forward-facing includes receiving a forward-facing seat signal indicating that the front seat is forward-facing.

6. The vehicle of claim 5, wherein the instructions further include instructions to maintain the external vent in a closed position during inflation of the airbag in response to at least the forward-facing seat signal.

7. The vehicle of claim 6, wherein the instructions further include instructions to release a tether to open the external vent in response to at least the rearward-facing seat signal.

8. The vehicle of claim 1, wherein the instructions further include instructions to receive an occupancy signal indicating that the front seat is occupied by an occupant and inflate the airbag in response to at least the occupancy signal.

9. A controller comprising a processor and a memory storing instructions executable by the processor to:
receive a frontal impact signal indicating detection of a collision to a front of a vehicle;
identify that a front seat is rearward-facing;
identify that the front seat is forward-facing;
inflate an airbag in response to at least the frontal impact signal; and
open an external vent in the airbag in response to identification that the front seat is rearward-facing; and
maintain the external vent in a closed position in response to identification that the front seat is forward-facing.

10. The controller of claim 9, wherein the identification that the front seat is rearward-facing includes receiving a rearward-facing seat signal indicating that the front seat is rearward-facing.

11. The controller of claim 10, wherein the instructions further include instructions to open the external vent in the airbag during inflation in response to at least the rearward-facing seat signal.

12. The controller of claim 10, wherein the wherein the instructions further include instructions to maintain the external vent in the closed position in the absence of the rearward-facing seat signal.

13. The controller of claim 9, wherein the identification that the front seat is forward-facing includes receiving a forward-facing seat signal indicating that the front seat is forward-facing.

14. The controller of claim 13, wherein the instructions further include instructions to maintain the external vent in the closed position during inflation of the airbag in response to at least the forward-facing seat signal.

15. The controller of claim 9, wherein the instructions further include instructions to receive an occupancy signal indicating that the front seat is occupied by an occupant and inflate the airbag in response to at least the occupancy signal.

16. The controller of claim 9, wherein the instructions further include instructions to release a tether to open the external vent.

17. A method comprising:
receiving a frontal impact signal indicating detection of a collision to a front of a vehicle;
identifying that a front seat is rearward-facing;
identifying that the front seat is forward-facing;
inflating an airbag in response to at least the frontal impact signal; and
opening an external vent in the airbag in response to at least the frontal impact signal and identification that the front seat is rearward-facing; and
maintaining the external vent in the closed position in response to at least the frontal impact signal and identification that the front seat is forward-facing.

18. The method of claim 17, wherein identifying that a front seat is rearward-facing includes receiving a rearward-facing seat signal indicating that the front seat is rearward-facing.

19. The method of claim 17 wherein identifying that the front seat is forward-facing includes receiving a forward-facing seat signal indicating that the front seat is forward-facing.

20. The method of claim 17, further comprising receiving an occupancy signal indicating that the front seat is occupied by an occupant and inflating the airbag in response to at least the occupancy signal.

* * * * *